(12) United States Patent
Burger et al.

(10) Patent No.: US 12,111,969 B2
(45) Date of Patent: Oct. 8, 2024

(54) ACTUATOR UNIT AND METHOD FOR GENERATING AN AMPLIFIED HAPTIC SIGNAL

(71) Applicant: TDK Electronics AG, Munich (DE)

(72) Inventors: Johannes Burger, Deutschlandsberg (AT); Wolfgang Wallnöfer, Deutschlandsberg (AT)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 18/251,912

(22) PCT Filed: Nov. 10, 2021

(86) PCT No.: PCT/EP2021/081198
§ 371 (c)(1),
(2) Date: May 5, 2023

(87) PCT Pub. No.: WO2022/101248
PCT Pub. Date: May 19, 2022

(65) Prior Publication Data
US 2024/0012483 A1    Jan. 11, 2024

(30) Foreign Application Priority Data
Nov. 16, 2020 (DE) .......................... 102020130203.7

(51) Int. Cl.
*G06F 3/01*  (2006.01)
*B06B 1/06*  (2006.01)
(Continued)

(52) U.S. Cl.
CPC ............ *G06F 3/016* (2013.01); *B06B 1/0648* (2013.01); *B06B 3/00* (2013.01); *G06F 3/03545* (2013.01); *G06F 3/038* (2013.01); *G06F 3/0414* (2013.01)

(58) Field of Classification Search
CPC .. G06F 3/03545; G06F 3/0414; G06F 3/0346; G06F 3/016; G06F 3/038; B06B 3/00; B06B 1/0648
See application file for complete search history.

(56) References Cited

U.S. PATENT DOCUMENTS

| 5,729,077 A | 3/1998 | Newnham et al. |
| 7,225,790 B2 | 6/2007 | Bartunek et al. |

(Continued)

FOREIGN PATENT DOCUMENTS

| DE | 19643180 B4 | 12/2009 |
| DE | 102017208238 A1 | 11/2018 |

(Continued)

OTHER PUBLICATIONS

Guitarte Perez, J. (Authorized officer) International Search Report and Written Opinion dated Feb. 14, 2022, PCT Application No. PCT/EP2021/081198, with English language translation, 11 pages.

(Continued)

*Primary Examiner* — Deeprose Subedi
(74) *Attorney, Agent, or Firm* — MH2 Technology Law Group LLP

(57) ABSTRACT

The present invention relates to an actuator unit which is designed to generate a haptic signal, having a piezoelectric actuator which is designed to change its extent in a longitudinal direction as a function of an electrical voltage, a mechanical amplifier which is designed to amplify the haptic signal by converting the change in extent of the piezoelectric actuator into a movement of the actuator unit, wherein the movement occurs in the longitudinal direction, and the movement of the actuator unit occurs over a distance which is longer than the change in extent of the piezoelectric actuator, and the longitudinal direction is the direction in which an extent of the piezoelectric actuator is largest.

25 Claims, 6 Drawing Sheets

(51) Int. Cl.
*B06B 3/00* (2006.01)
*G06F 3/0354* (2013.01)
*G06F 3/038* (2013.01)
*G06F 3/041* (2006.01)

(56) References Cited

U.S. PATENT DOCUMENTS

| | | | |
|---|---|---|---|
| 10,725,544 B1 * | 7/2020 | Taylor | G06F 3/041 |
| 2004/0119377 A1 | 6/2004 | Frank et al. | |
| 2006/0033405 A1 | 2/2006 | Kronberger | |
| 2016/0027263 A1 | 1/2016 | Parker et al. | |
| 2016/0282970 A1 | 9/2016 | Evreinov et al. | |
| 2017/0364167 A1 | 12/2017 | Ribeiro et al. | |
| 2019/0196597 A1 | 6/2019 | Rinner et al. | |
| 2019/0391652 A1 | 12/2019 | Kirsch et al. | |
| 2021/0247845 A1 | 8/2021 | Kugerl et al. | |

FOREIGN PATENT DOCUMENTS

| | | |
|---|---|---|
| DE | 102018120760 A1 | 1/2020 |
| EP | 3214526 A1 | 9/2017 |
| JP | 2000200140 A | 7/2000 |
| JP | 2006014585 A | 1/2006 |
| JP | 2011206634 A | 10/2011 |
| JP | 2018129731 A | 8/2018 |
| JP | 2020507849 A | 3/2020 |
| KR | 10-2017-0018658 A | 2/2017 |
| WO | 2004076848 A1 | 9/2004 |
| WO | 2018046201 A1 | 3/2018 |
| WO | 2020011403 A1 | 1/2020 |
| WO | 2020011526 A1 | 1/2020 |

OTHER PUBLICATIONS

Japanese Notice of Reasons for Refusal issued in corresponding Japanese Patent Application No. 2023-528529, dated May 29, 2024, with English language translation, 12 pages.

* cited by examiner

-◇- deflection lever   -◇- deflection actuator

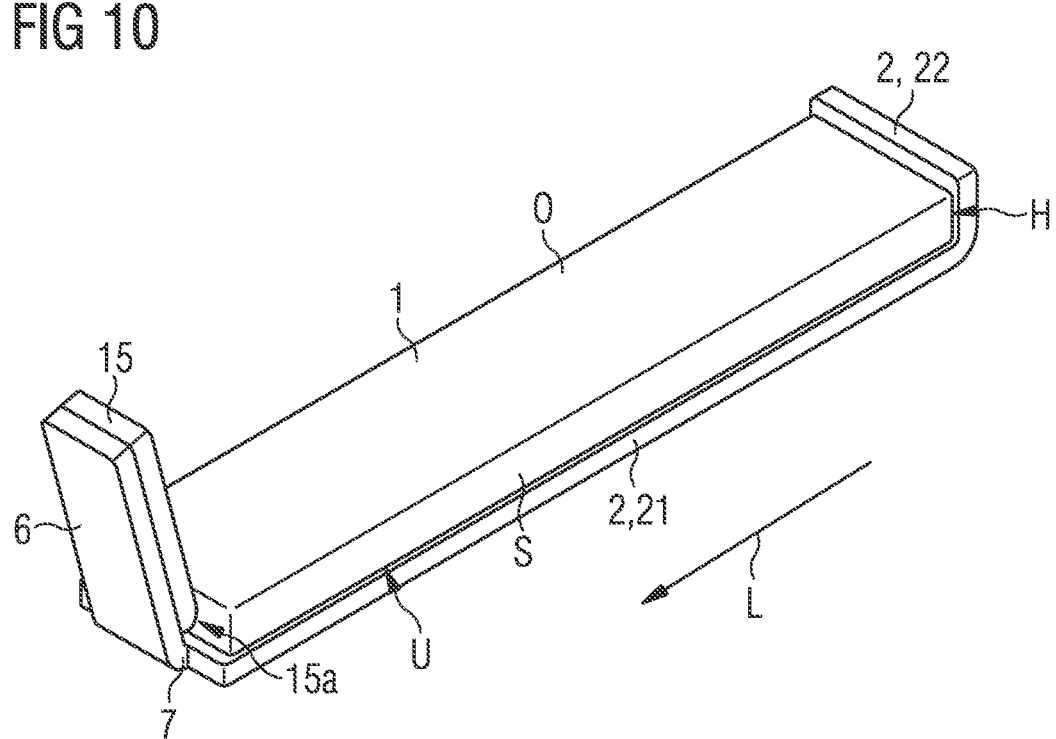
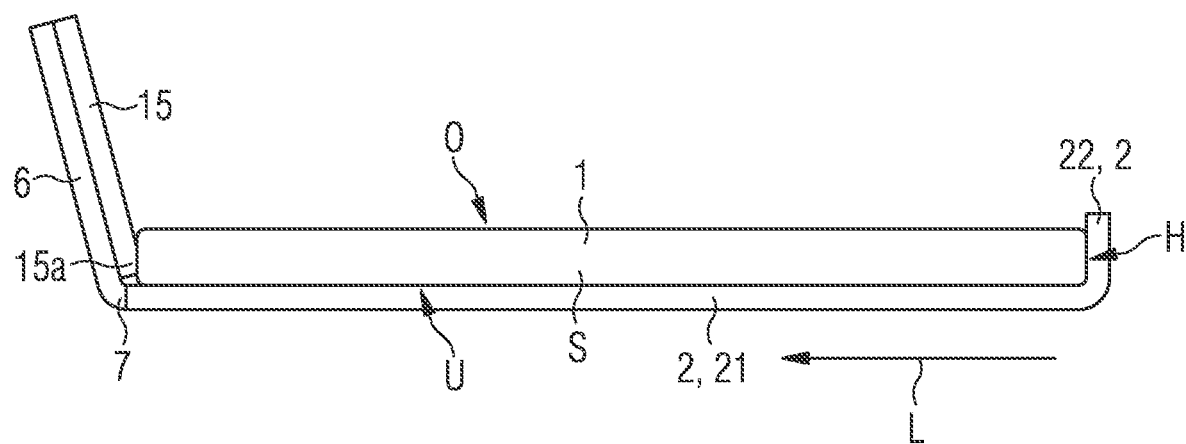

ACTUATOR UNIT AND METHOD FOR GENERATING AN AMPLIFIED HAPTIC SIGNAL

CROSS-REFERENCE TO RELATED APPLICATIONS

The present application is the national stage entry of International Patent Application No. PCT/EP2021/081198, filed on Nov. 10, 2021, and published as WO 2022/101248 A1 on May 19, 2022, which claims the benefit of priority of German Patent Application No. 10 2020 130 203.7, filed on Nov. 16, 2020, the disclosures of all of which are incorporated by reference herein in their entireties.

FIELD OF THE INVENTION

The present invention relates to an actuator unit and a method for generating an amplified haptic signal.

BACKGROUND OF THE INVENTION

In the field of augmented reality applications, styluses with which a previously stored surface can be scanned are increasingly being used. The user is given the impression that the stylus is being moved over a surface profile. In order to reproduce the profile realistically, an actuator with a fast response time that triggers a sufficiently strong movement is advantageous.

Similar styluses with actuators are disclosed, for example, in WO 2020/011526 A1, KR 10 2017 018 658 A and US 2017/0364167 A1. Here, piezoelectric actuators are used to generate the haptic signal.

DE 10 2017 208 238 A1 further discloses a control element in which a piezoelectric actuator is installed. The piezoelectric actuator comprises a carrier element on which piezoelectric elements are surface-mounted. The piezoelectric actuator generates a haptic signal for a touchscreen of a display device. A mechanical lever is provided to amplify the haptic signal, which converts the change in extension of the piezoelectric element into a larger change in extension of the actuator. The changes in extension of the element and the actuator run in the same direction.

EP 3 214 526 A1 also discloses a display device with touchscreen, comprising haptic piezo sensors and actuators. The force of the haptic signal of the piezo actuator can be amplified by a lever mechanism.

US 2016/0027263 A1 discloses a further mechanism for amplifying a haptic signal for a touchscreen of a display device. The signal of a piezo-electric actuator, for example, is amplified by a lever mechanism by a factor of 2:1 to a maximum of 5:1.

US 2004/0119377 A1 discloses a piezoelectric actuator comprising, for example, a plurality of piezoelectric disks stacked on top of each other. The actuator can expand along a longitudinal direction by applying an electrical voltage. The actuator thereby acts with its end face on a transmission element. By means of the transmission element, a short deflection of the actuator is translated to a desired longer deflection of an actuator.

U.S. Pat. No. 7,225,790 B2 also discloses a piezoelectric actuator to be used as an actuator in a valve. The valve lift is mechanically increased relative to the deflection of the actuator via a lever mechanism.

US 2006/0033405 A1 concerns a device for transmitting a deflection of a piezoelectric actuator of an injection valve. The device comprises a lever device which has a first and a second transmission element which transmit the deflection of the actuator to a valve actuator. Furthermore, spring elements for guiding and supporting the first transmission element are disclosed.

WO 2004/076848 A1 discloses another piezoelectric actuator, in particular for use as an actuator in a valve, wherein the valve lift is amplified by a mechanical lever mechanism.

DE 10 2018 120 760 A1 discloses a stylus-shaped input and output device having an actuator unit comprising a piezoelectric actuator. Furthermore, the application relates to a method for generating a haptic signal of the input and output device.

US 2016/0282970 A1 relates to another haptic stylus comprising an input stylus tip to be in contact with a touch screen. Further, the stylus comprises a first actuator configured to cause a stick-slip phenomenon between a stylus cover and the user's fingers holding the stylus cover.

Due to the increasing miniaturization of such haptic input devices and due to the higher space requirements of energy storage devices, which should enable a longer operating time of the pen, an actuator with minimized dimensions is desirable.

SUMMARY OF THE INVENTION

It is therefore a task of the present invention to specify an advantageous actuator unit or an advantageous stylus-shaped input and/or output device. A further task is to specify an advantageous method for generating a haptic signal with such an input and/or output device.

The task is solved by the actuator unit according to claim 1 as well as by a stylus-shaped input and/or output device and a method according to the further independent claims. The stylus-shaped input and/or output device is hereinafter also referred to as a stylus or as a device.

An actuator unit is proposed that is configured to generate a haptic signal.

For this purpose, the actuator unit has a piezoelectric actuator that is designed to change its extension in a longitudinal direction depending on an electrical voltage applied to it, thereby generating the haptic signal.

Furthermore, the actuator unit has a mechanical amplifier which is designed to amplify the haptic signal by converting the change in extension of the piezoelectric actuator into a movement of the actuator unit. This movement takes place in the longitudinal direction of the actuator unit.

The distance of movement of the actuator unit in the longitudinal direction is longer than the change in extension of the piezoelectric actuator.

The longitudinal direction is referred to here and in the following as the direction in which the actuator has the longest extension. In at least one embodiment, the actuator has an approximately cuboidal or prismatic geometry, which has a comparatively long dimension in the longitudinal direction and shorter dimensions in the directions perpendicular to the longitudinal direction.

By using the mechanical amplifier, the size of the piezoelectric actuator can be minimized. Even a comparatively small change in the extension of a minimized piezoelectric actuator can be converted into a sufficiently large haptic signal via the mechanical amplifier.

To make a virtual surface profile haptically detectable, sufficiently strong signals in the longitudinal direction of the actuator unit are particularly helpful. Such signals are obtained by amplifying the change in extension of the actuator in the longitudinal direction.

In one embodiment, the actuator unit further comprises a control unit configured to apply a voltage to the piezoelectric actuator.

The virtual surface profile can be stored in the control unit. The control unit can control the actuator in such a way that a haptic signal matching the surface profile is generated. If a sensing element connected to the actuator unit is moved, for example, over a point on a surface where the virtual surface profile provides an elevation, a corresponding haptic signal can be generated. The sensing element is, for example, a tip of a stylus-shaped input and/or output device.

In one embodiment, the piezoelectric actuator comprises a multilayer element having piezoelectric ceramic layers or piezoelectric polymer layers.

The multilayer element comprises several ceramic layers or polymer layers and inner electrodes arranged in between. The inner electrodes are electrically contacted, for example, by outer electrodes attached to the side of the multilayer element. The layers are stacked in a stacking direction perpendicular to the longitudinal direction.

When an electrical voltage is applied in the stacking direction, the multilayer element deforms more than, for example, a monolithic ceramic or polymer element. This facilitates the miniaturization of the piezoelectric actuator.

In one embodiment, the piezoelectric actuator is configured to have a voltage applied to the actuator in a transverse direction perpendicular to the longitudinal direction, which causes a change in extension of the piezoelectric actuator in the longitudinal direction of the device according to the d31 effect. For example, the voltage is applied in the stacking direction.

In the transverse direction, the actuator unit has a small dimension compared to its length in the longitudinal direction. By means of a comparatively low voltage, the extension of the piezoelectric actuator can thus be changed. The outer electrodes for applying the voltage to the piezoelectric actuator then lie against the surfaces of the actuator that point in the transverse direction.

According to one embodiment, the mechanical amplifier comprises a carrier element that fixes the piezoelectric actuator. In one embodiment, the piezoelectric actuator is attached to the carrier element.

The carrier element is a bar made of metal, for example. The piezoelectric actuator is positively fixed to the carrier element, for example. The actuator is attached to the carrier element, for example, by adhesive bonding.

The support member has a front end facing toward a surface to be scanned and an opposite rear end.

In one embodiment, the actuator is attached to the support member at its rear end. In one embodiment, the piezoelectric actuator is clamped between a rear end of the carrier element and the lever element at the front end of the carrier element.

In particular, the carrier element comprises, for example, a bar, a rear section, and the lever element. In one embodiment, the rear section is adjacent to the rear end of the piezoelectric actuator. The lever element abuts the front end of the piezoelectric actuator, and the bar connects the rear section to the lever element along one or more side surfaces of the piezoelectric actuator. Thus, the piezoelectric actuator is positively secured to the support member. Additionally, the piezoelectric actuator may be bonded to the rear section or the bar.

If the piezoelectric actuator expands when an electrical voltage is applied, the rear end of the actuator is fixed so that the front end moves relative to the carrier element. The movement due to the change in extension of the actuator in the longitudinal direction generates the desired haptic signal.

In one embodiment, the mechanical amplifier comprises a lever element that is fixed to the carrier element at a first end. For this purpose, the carrier element has projections at its front end, for example, in which the lever element engages at its first end.

For example, suitable latching lugs are provided at the first end of the lever element for this purpose.

The lever element is, for example, a sheet or bar of metal.

In another embodiment, the lever element and the carrier element are formed from a single part and are flexibly connected. For example, the material at the transition between the carrier element and the lever element is thinned so that the lever element can be moved pivotably relative to the carrier element.

The piezoelectric actuator is in contact with the lever element in both previously described embodiments, so that a change in the extension of the piezoelectric actuator results in a movement of a second end of the lever element in the longitudinal direction, which is opposite the first end. This second end is also referred to hereinafter as the free end of the lever element.

In particular, the front end of the piezoelectric actuator rests against the lever element. When the piezoelectric actuator expands, its front end moves toward the lever element and pushes the free end of the lever element forward away from the actuator.

In one embodiment, the actuator and lever element are connected via a bending joint. For this purpose, the first end of the lever element has an axle that is mounted in bearings provided for this purpose on the front end of the carrier element so that it can rotate freely. When the piezoelectric actuator is extended, the second end of the lever element then performs a pivoting movement or moves along a circular path. The movement in the longitudinal direction is superimposed on a movement in a direction perpendicular to the longitudinal direction.

The deflection due to the movement of the lever element in the longitudinal direction is greater than the change in extension of the piezoelectric actuator in the longitudinal direction.

In one embodiment, a force transmission part is fixed on the surface of the piezoelectric actuator facing the lever element, with the lever element only resting against the force transmission part.

In this embodiment, the piezoelectric actuator is therefore not in direct contact with the lever element. Instead, the force transmission part allows a targeted and adjustable transmission of a force from the actuator to the lever element.

In one embodiment, the force transmission part has a bend formed in the direction of the lever element, with the lever element only resting against the bend.

The force transmission part is bonded to the front of the actuator, for example. In one embodiment, the force transmission part is a metal sheet.

The bend is pronounced in the direction of the lever element. Only one contact area at the front of the bend is in contact with the lever element. The deflection of the lever and thus the amplification factor of the mechanical amplifier can be adjusted by suitable selection of the position of the bend.

In one embodiment, a force transmission part is fixed on a surface of the lever element facing the piezoelectric actuator, wherein the piezoelectric actuator is only in contact with the force transmission part.

The force transmission part then has the advantage that it mechanically reinforces the lever element. The force transmission part preferably has a high stiffness, so that the stiffness of the lever element is also improved.

The lever element and the force transmission part preferably comprise different materials. Preferably, the force transmission part comprises stainless steel.

Preferably, a contact area of the force transmission part that is in contact with the piezoelectric actuator is machined so that it is as resistant to wear as possible. For example, the contact area has a surface reinforced by coating.

For example, the contact area is designed such that the area of the contact area to the piezoelectric actuator is maximized. For example, a contact edge of the force transmission part facing the piezoelectric actuator and in contact with the piezoelectric actuator is ground down to provide a contact area with a larger surface area.

In one embodiment, the force transmission part is bonded to the surface of the lever element facing the piezoelectric actuator. Preferably, the force transmission part covers almost the entire surface. The dimensions of the lever element and the force transmission part are thus preferably similar. The force transmission part is designed, for example, as a flat plate that is bonded to the surface of the lever element.

In one embodiment, the force transmission part has a bend formed in the direction of the piezoelectric actuator, with the piezoelectric actuator only resting against the bend. The bend additionally increases the stiffness of the force transmission part and thus the lever element.

In one embodiment, a surface of the lever element facing the piezoelectric actuator has a bend formed in the direction of the piezoelectric actuator, with the piezoelectric actuator only abutting the bend. The bend is provided directly in the lever element. In one embodiment, the lever element is bulged for this purpose so that a cavity is formed on the surface of the lever element facing away from the piezoelectric factor.

Such a bulge in the lever element forms a bend in the direction of the piezoelectric actuator, which also increases the stiffness of the lever element.

Only one contact area at the front of the bend of the lever element is in contact with the piezoelectric actuator. By suitable selection of the position of the bend, the deflection of the lever and thus the amplification factor of the mechanical amplifier can be adjusted.

In one embodiment, the lever element further comprises one or more metal tabs bent out of the lever element and secured to the piezoelectric actuator on a surface other than the surface of the piezoelectric actuator facing the lever element. For example, the metal tabs are bonded to the piezoelectric actuator.

For example, two metal tabs are provided on a first side and a second side of the lever element bounding the surface facing the piezoelectric actuator.

When the piezoelectric actuator is contracted, the lever element, which is fixed to the piezoelectric actuator via the metal tabs, is thus moved in the direction of the piezoelectric actuator.

In one embodiment, one or more areas are bent out of the lever element. These areas are fixed to the piezoelectric actuator.

In one embodiment, the bent-out area is a latch that is fixed on the surface of the piezoelectric actuator facing the lever element. Alternatively, the fixation is also performed on side surfaces, for example, perpendicular to the side of the lever element facing the piezoelectric actuator.

In these embodiments, the lever element is, for example, a part of the carrier element or is fixedly connected to the carrier element.

The lever element comprises, for example, a metal sheet from which the latch is cut out. The metal sheet is sufficiently flexible so that the cut-out latch can be bent out of the lever element.

In one embodiment, the latch is bonded to the front surface of the actuator.

In one embodiment, the actuator is fixed to the carrier element at its rear end. If the actuator expands, the front end of the actuator moves in the direction of the lever element and thus moves the lever element forward. The deflection of the lever element is greater than the change in extension of the actuator.

In one embodiment, the piezoelectric actuator is attached to the carrier element in a planar manner, so that a change in the extension of the piezoelectric actuator leads to a deformation of the carrier element.

Furthermore, a bending part is attached to one end of the carrier element, which has a bent shape and which bends in the longitudinal direction depending on the deformation of the carrier element. Preferably, the bending part is attached to the front end of the carrier element.

In this embodiment, both the front and rear ends of the actuator are attached to the carrier element. The actuator is glued to the carrier element, for example. A change in extension of the actuator therefore leads to bending of the carrier element. In this embodiment, the carrier element is designed so that it can be easily bent.

The bending part is designed, for example, as part of the carrier element. The bending part bends as a function of the bending of the carrier element. The deflection of the bending part in the longitudinal direction is greater than the change in extension of the actuator.

In at least one embodiment, the actuator unit is designed to be moved in the longitudinal direction over a distance that is at least twice as long as the change in extension of the piezoelectric actuator. Thus, the haptic signal can be significantly amplified. In further embodiments, the distance by which the actuator unit is moved is at least three times or at least four times as long as the change in extension of the piezoelectric actuator. The ratio of said distance to change in extension can be adjusted, for example, as described above via the position of the contact area.

The invention further relates to a stylus-shaped input and/or output device comprising a housing and an actuator unit arranged therein. The actuator unit is configured, for example, as previously described.

The mechanical amplifier is configured to convert the change in extension of the piezoelectric actuator into a movement of the actuator unit relative to the housing, the movement being in a longitudinal direction of the stylus-shaped device. The actuator unit is arranged and fixed in the stylus-shaped device such that the longitudinal direction of the stylus-shaped device coincides with the longitudinal direction of the actuator unit.

The stylus-shaped device has a tip that can be used to scan a surface. The side of the tip is defined as the front side of the stylus-shaped device. The opposite side is defined as the rear side of the stylus-shaped device. In the direction pointing from the rear side to the tip, the stylus-shaped device has its longest dimension. This direction is the longitudinal direction of the stylus-shaped device. In any direction perpendicular to the longitudinal direction, the stylus-shaped device has significantly smaller dimensions than along the longitudinal direction.

The carrier element is fixed in the housing of the stylus-shaped device. The rear end of the carrier element points towards the rear side of the stylus-shaped device, the front end towards the tip of the stylus-shaped device, i.e. its front side.

If the actuator moves relative to the carrier element, it also moves relative to the housing. The movement due to the change in extension of the actuator in the longitudinal direction of the stylus-shaped device generates the desired haptic signal of the stylus-shaped device.

The mechanically amplified movement of the actuator unit is transmitted, for example, by direct contact to the tip, which is arranged movably to the housing.

In one embodiment, the second end of the lever element is configured to transmit motion to the tip by direct contact. For example, the tip is designed as a monolithic component that is movable relative to the housing of the stylus. The distance by which the tip is moved corresponds to the distance by which the lever element is deflected in the longitudinal direction.

In one embodiment, the outer electrodes for applying the voltage to the piezoelectric actuator lie against the surfaces of the actuator that face in the transverse direction. The space requirement in the housing along the longitudinal direction of the stylus is thus reduced.

In one embodiment, the stylus-shaped input and/or output device further comprises a sensor in addition to the piezoelectric actuator. The sensor is, for example, an inclination sensor and/or a distance sensor and/or a speed sensor and/or an acceleration sensor.

The aforementioned sensors increase the resolution of a surface to be scanned and enable a more precise adaptation of the haptic signal to a virtual surface profile.

In one embodiment, the stylus-shaped input and/or output device is configured to generate a haptic signal that replicates a surface profile, wherein the values measured by the sensor are processed when the actuator is controlled.

For example, the sensor is one of the above sensors and serves the above purpose.

In one embodiment, the piezoelectric actuator is configured to be used as a pressure sensor.

When the tip is pressed against a surface, the tip, which is slidably attached to the stylus housing, moves in the direction of the piezoelectric actuator. Since the rear end of the actuator is attached to the carrier element and/or is attached to or abuts the stylus housing at the rear end, this compresses the actuator, which corresponds to a change in extension. The change in extension of the piezoelectric actuator generates an electrical voltage. The voltage is interpreted by an electrical evaluation unit, for example, as a quantitative signal representing the amount of pressure acting on the tip.

In one embodiment, the displacement of the tip is first transmitted to the lever element, which is then pressed against the piezoelectric actuator. The acting force on the actuator generates a charge due to the piezoelectric effect and thus generates an electrical signal.

The invention further relates to a method for generating a haptic signal with a stylus-shaped input and/or output device comprising an actuator unit with a piezoelectric actuator.

A voltage is applied to the piezoelectric actuator in a direction perpendicular to a longitudinal direction by a control unit, so that the piezoelectric actuator changes its extension.

The change in extension is converted by a mechanical amplifier into a movement of the actuator unit in the longitudinal direction.

The actuator unit is moved in the longitudinal direction over a distance longer than the change in extension of the piezoelectric actuator.

The longitudinal direction here is the direction in which an extension of both the piezoelectric actuator and the stylus-shaped input and/or output device is greatest.

The actuator unit and the stylus-shaped input and/or output device are, for example, the actuator unit described above and/or the device described above in any embodiment.

BRIEF DESCRIPTION OF THE DRAWINGS

In the following, specific embodiments of the invention will be described with reference to figures. The invention is not limited to the examples shown.

The figures show:

FIG. 10: Perspective view of a fifth embodiment of the piezoelectric actuator and mechanical amplifier.

FIG. 11: Side view of the fifth embodiment of the piezoelectric actuator and the mechanical amplifier.

DETAILED DESCRIPTION

Figure 1:
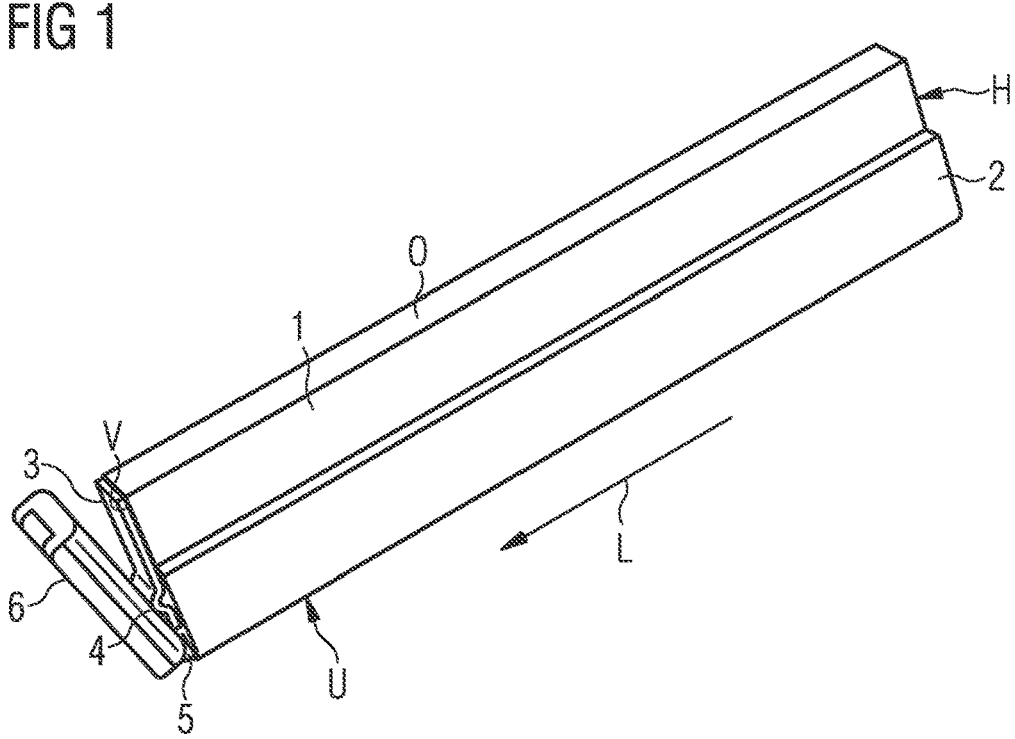
FIG. 1: Perspective view of a first embodiment of the piezoelectric actuator and the mechanical amplifier.

FIG. 1 shows a first embodiment of the piezoelectric actuator 1. The piezoelectric actuator 1 is mounted on a metallic carrier element 2.

The side of the actuator 1, of the carrier element 2 and of all other components built into a stylus-shaped input and/or output device which, in the installed state, points in the direction of the tip of the stylus-shaped input and/or output device is referred to below as the front or front side. The side facing away from the tip in the installed state is referred to as the rear or back side. The front side and the rear side are perpendicular to a longitudinal direction L of the stylus-shaped device.

The longitudinal direction L is referred to here and in the following as the direction from the rear to the front, i.e. to the tip, of the stylus-shaped device, in which the stylus-shaped device has its greatest extension.

In the present example, the actuator 1 has a cuboid shape. The cuboid actuator 1 has a front side V and a rear side H as defined above. Furthermore, the cuboid actuator 1 has a bottom side U, a top side O and two longitudinal sides connecting the front side and the rear side of the cuboid along the longitudinal direction L. The direction in which the bottom side U points is also referred to as bottom in the following, and the direction in which the top side O points is also referred to as top in the following.

The bottom side U, the top side O and the two longitudinal sides of the actuator 1 have larger dimensions along the longitudinal direction L than in a direction perpendicular to the longitudinal direction L. In particular, the dimensions along the longitudinal direction L are larger than the dimensions of the front or the rear side V, H of the actuator 1.

In the current example, the piezoelectric actuator 1 is designed as a multilayer ceramic element. The ceramic multilayer element comprises a plurality of ceramic layers and inner electrodes arranged therebetween, which are stacked in a stacking direction. The stacking direction corresponds to a direction perpendicular to the longitudinal direction L.

In the present example, the carrier element 2 is designed as a trough-shaped metallic bar. An open cuboid shape comprising at least one underside, two longitudinal sides and a rear side is referred to here as a trough shape. Alternatively, the carrier element 2 does not have a rear side, but may be open towards the rear.

The carrier element 2 has a cavity between the described sides in which the actuator 1 is embedded. The carrier element 2 does not have a closed upper side, but is open at the top. The sides of the carrier element 2 are named here analogously to the actuator 1.

The cavity in the carrier element 2 is dimensioned so that the piezoelectric actuator 1 can be embedded therein. The dimensions of the cavity correspond approximately to the dimensions of the actuator 1. The trough-shaped carrier element 2 lies flat against the long sides, the underside U and, if the carrier element 2 is closed at the rear, also against the rear side H of the actuator 1. The actuator is attached to the carrier element 2 at its rear side or at its longitudinal sides at the rear, e.g. by adhesive bonding.

In the installed state and if the carrier element 2 is not closed at the rear, the rear side H of the actuator alternatively lies at the rear directly against a housing 11 of the stylus-shaped device and is optionally additionally bonded to the latter.

Thus, the carrier element 2 restricts the freedom of movement of the actuator 1 in the event of a change in the extension of the actuator material. Only in the direction of the front side V and the top side O can the actuator 1 expand relative to the carrier element 2.

A force transmission part 3 is attached to the front side V of the piezoelectric actuator 1 for force transmission. The force transmission part 3 is bonded to the front side V of the actuator 1. The force transmission part 3 has a bend in the direction of the front of the stylus. At the bend, the force transmission part 3 curves forward from the surface of the actuator 1. The front surface of the bend defines a contact area 4.

At the front of the carrier element 2, a lever element 6 is also fixed in a freely pivoting manner via a bending joint 5. The bending joint is arranged on a front edge of the underside of the carrier element 2. In the present example, the lever element 6 is made of a metal sheet. The lever element 6 can perform a pivoting movement about the bending joint 5, moving both forwardly or rearwardly in the longitudinal direction L and downwardly or upwardly in a transverse direction perpendicular to the longitudinal direction L. In the installed state, the lever element 6 rests on the force transmission part 3 and also on the tip of the stylus-shaped device.

If an electrical voltage is applied to the piezoelectric actuator 1, the actuator 1 expands. Since the actuator 1 is in contact with the carrier element 2 at least at its rear side H, the actuator 1 expands in particular in the direction of the front side V. In one embodiment, the actuator 1 is attached to the carrier element 2 at the rear end of its longitudinal sides and/or at its rear side H, for example by adhesive bonding.

The force transmission part 3 attached to the front or the contact area 4 pronounced thereon then presses against the lever element 6, thus causing the lever element 6 to deflect forward in the longitudinal direction L.

The deflection of the lever element 6 is greater than the change in extension of the piezoelectric actuator 1 in the longitudinal direction L. In the present embodiment, the deflection in the longitudinal direction L is at least twice, preferably at least three times, the change in extension of the actuator 1.

Figure 2:
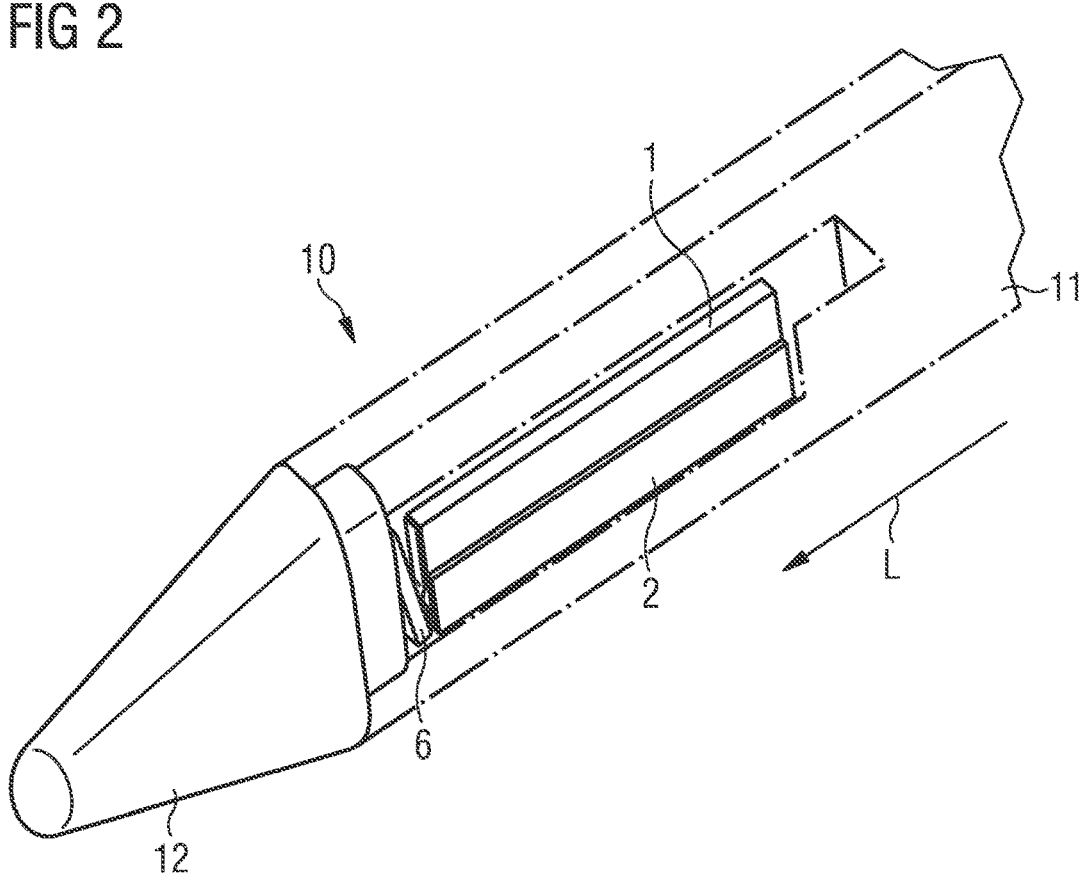
FIG. 2: Section of a perspective view of a first embodiment of the stylus-shaped input and/or output device comprising the piezoelectric actuator with mechanical amplifier of the first embodiment.

The piezoelectric actuator 1 and the carrier element 2 are incorporated in a stylus-shaped device 10. FIG. 2 shows the stylus-shaped device 10. The device 10 includes the housing 11. A tip 12 is attached to one side of the housing 11. The side of the tip 12 is referred to as the front side of the stylus-shaped device 10. The opposite side is referred to as the rear side of the stylus-shaped device 10. The tip 12 is formed, for example, as a monolithic component. The direction pointing from the front side to the rear side of the device 10 is referred to as the longitudinal direction L. The tip 12 is attached to the front side of the housing 11 such that it is freely displaceable in the longitudinal direction L.

The actuator unit shown in FIG. 1 comprising the piezoelectric actuator 1 and the carrier element 2 is arranged in the longitudinal direction L of the stylus 10 immediately behind the tip 12 in the housing 11.

The carrier element 2, which holds the actuator 1, is fixed in the housing 11 for this purpose.

The carrier element 2 rests on a surface of the piezoelectric actuator 1 at least on the rear side H, but not on its front side V. When the piezoelectric actuator 1 is deformed, it can thus expand forward, but not backward. Due to its change in extension, the piezoelectric actuator 1 moves relative to the carrier element 2. Since the carrier element 2 is fixed in the housing 11, the actuator also moves relative to the housing 11.

The free end of the lever element 6 then presses against the tip 12, which is displaceable in the longitudinal direction L. The tip 12 is thus deflected by a distance that depends on the deflection of the lever element 6.

Thus, a haptic signal that can be experienced by the user of the stylus-shaped device 10 is generated.

The stylus-shaped device 10 is used, for example, to make a virtual surface profile, which is displayed on the surface of a screen, haptically perceptible. For this purpose, the virtual surface profile is stored, for example, in a control unit of the stylus-shaped device 10. If the stylus-shaped device 10 is moved over the surface of the screen, the control unit can apply electrical voltages of different levels to the piezoelectric actuator 1. The actuator 1 then expands as described so that a haptic signal is generated.

The tip 12 can only be moved forward by means of the lever element 6 of the present embodiment. A movement of the tip 12 backwards and a resulting swinging back of the lever element 6 occurs due to the pressure when the tip 12 is placed on the surface. Alternatively or additionally, a spring element is used to generate additional return pressure, which is not shown here.

The piezoelectric actuator 1 can also serve as a pressure sensor. If the tip 12 is placed on the surface with a defined pressure, the tip 12 shifts backward in the longitudinal direction L into the housing 11. In the process, the tip 12 presses against the lever element 6, which thus pivots backward and presses against the contact area 4. Via the contact area 4, the force is transmitted to the bending element 3 or the piezoelectric actuator 1, which thus deforms.

Due to the piezoelectricity of the actuator 1, the deformation is converted into a voltage signal that can be detected by an evaluation unit. The magnitude of the voltage signal is proportional to the pressure exerted on the tip 12.

Figure 3:
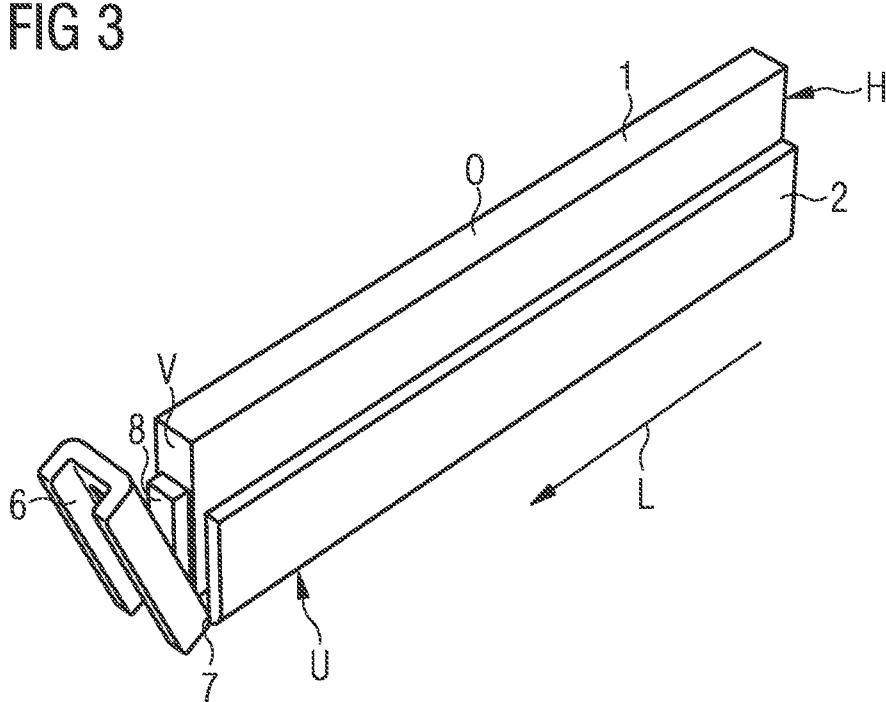
FIG. 3: Perspective view of a second embodiment of the piezoelectric actuator and the mechanical amplifier.
Figure 4:
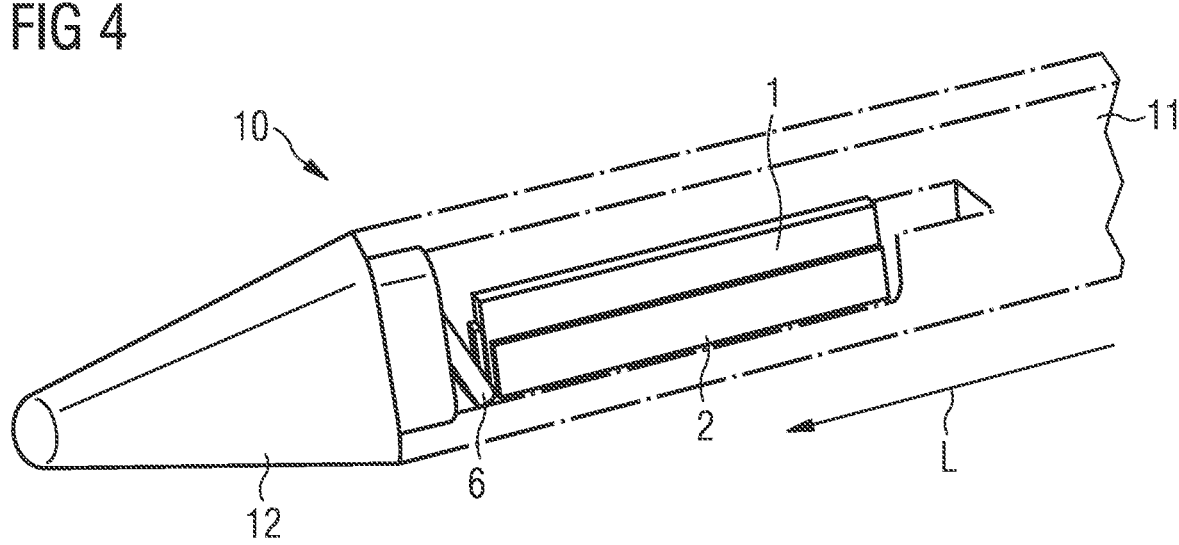
FIG. 4: Section of a perspective view of a second embodiment of the stylus-shaped input and/or output device comprising the piezoelectric actuator with mechanical amplifier of the second embodiment.

FIGS. 3 and 4 illustrate a second embodiment of the stylus-shaped device 10 with a second embodiment of the mechanical amplifier. Similar or identical features as in the first embodiment example are provided with the same reference signs and, in order to avoid repetition, are not described again in detail.

Analogous to the first embodiment, the actuator 1 is embedded in a carrier element 2 made of metal. The carrier element 2 is in contact with several surfaces of the actuator 1, in particular the rear side H and the underside U, and thus restricts the freedom of movement of the actuator 1 in the event of its extension. A change in the extension of the actuator 1 thus causes the actuator 1 to move forward and upward, as in the first embodiment.

The lever element 6 is directly attached to the front side V of the actuator 1 in the second embodiment.

In the present example, the lever element 6 is formed from the same component as the carrier element 2. For this purpose, the carrier element 2 has a section which rests against the front side V of the actuator 1 and is connected to the rest of the carrier element 2 only along a bending axis 7. The component is thinned along the bending axis 7.

A latch 8 is cut out centrally from this section. The latch 8 is attached to the front V of the actuator 1 by adhesive bonding. The part of the front section of the carrier element 2 surrounding the cut-out latch 8 forms the lever element 6, which is connected to the rest of the carrier element 2 only along the bending axis 7.

Alternatively, the latch 8 is also fixed to the longitudinal sides of the piezoelectric actuator 1.

If an electrical voltage is now applied to the actuator 1, the piezoelectric actuator 1 expands forward and thus also pushes the lever element 6 forward, which is directly connected to the actuator 1 via the latch 8. The deflection of the lever element 6 in the longitudinal direction L corresponds in the example to at least three times the change in extension of the piezoelectric actuator.

Compared to the first embodiments, the present embodiment has the advantage that shrinking the actuator 1 also causes the lever element 6 to swing back.

If the piezoelectric actuator 1 contracts, the latch 8 and thus the lever element 6 are moved backwards in the longitudinal direction L. The lever element 6 is then moved backwards. Unlike in the first embodiment, no external action is required for this.

The actuator 1 and the carrier element 2 are installed in the stylus-shaped device 10 analogously to the first embodiment example, which can also be used by a user analogously to the first embodiment example.

Figure 5:
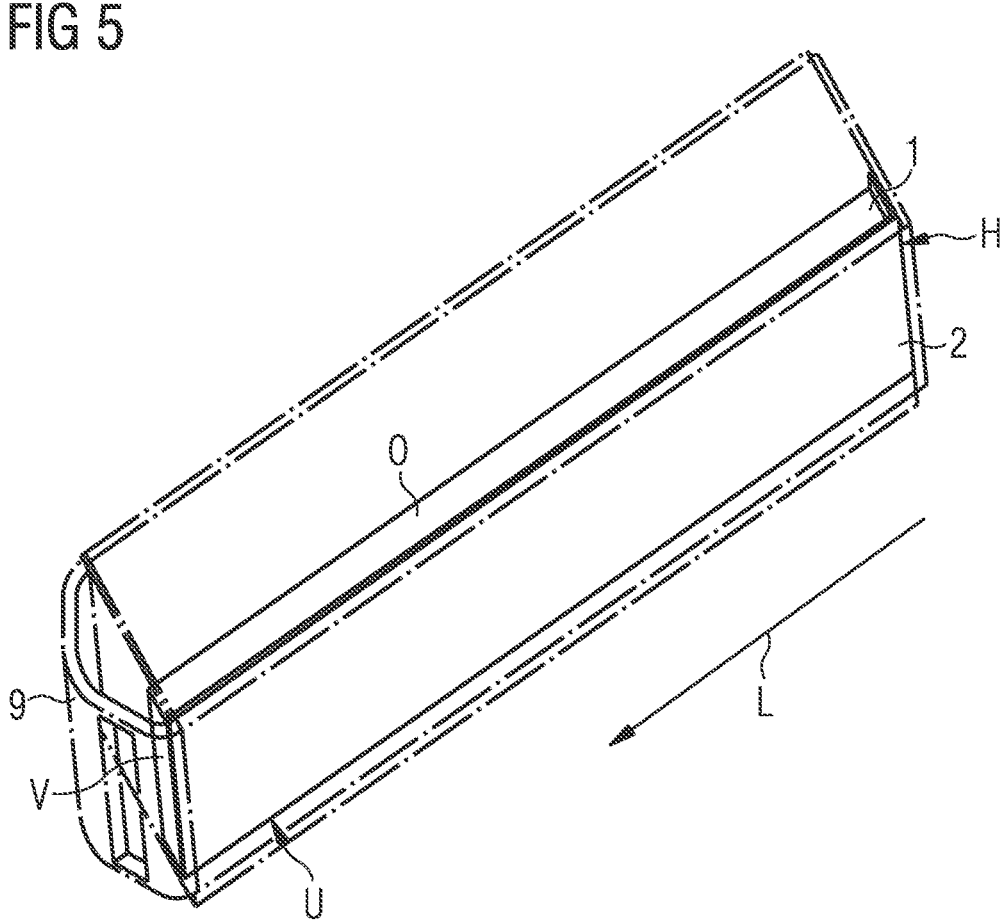
FIG. 5: Perspective view of a third embodiment of the piezoelectric actuator and the mechanical amplifier.

FIG. 5 shows a third embodiment of the actuator 1 with mechanical amplifier.

In this embodiment, the carrier element 2 does not have a trough shape, but forms a housing element that is closed on all sides except for the front side and surrounds a cavity. In contrast to the previous embodiments, the upper side of the carrier element 2 is also closed.

A bending part 9 is attached to the front of the carrier element 2, which has a curved shape and is firmly connected to the longitudinal sides of the carrier element 2 at two lateral ends.

In the present example, the actuator 1 is again arranged in the cavity of the carrier element 2 and fastened to the carrier element 2 over its entire length. For this purpose, the actuator 1 is bonded to the carrier element 2 over its entire surface on one of its longitudinal sides. In addition, the rear side H of the actuator is also bonded to the rear side of the carrier element 2, for example. The actuator 1 is dimensioned to extend from the front to the rear side and from the bottom to the top side of the carrier element 2. In a transverse direction perpendicular to the longitudinal direction L, on the other hand, the actuator 1 is dimensioned so narrowly that a cavity remains recessed in the carrier element 2 between the actuator and the longitudinal side to which the actuator 1 is not attached.

In this example, a change in extension of the actuator 1 causes a deformation of the carrier element 2.

Therefore, the carrier element 2 and the bending part 9 are designed as flexible metal parts in the present example. If the carrier element 2 deforms, the bending part 9 bends forward or backward in the longitudinal direction L depending on the deformation of the carrier element 2. The deflection of the bending part 9 due to bending is greater than the change in extension of the piezoelectric actuator 1 in the longitudinal direction L. The bending part 9 corresponds in its function to the lever element 6 from the previous examples.

In this example, too, no external action is required to move the lever element 6 back from a position deflected forward in the longitudinal direction L.

In all embodiments, the carrier element 2 and the lever element 6 act as mechanical amplifiers that convert a change in extension of the actuator 1 into a larger displacement in the longitudinal direction L of the stylus-shaped device 10.

In the following, the function of the stylus-shaped input and/or output device 10 will be described by way of example with reference to the diagrams in FIGS. 6 and 7.

Figure 6:
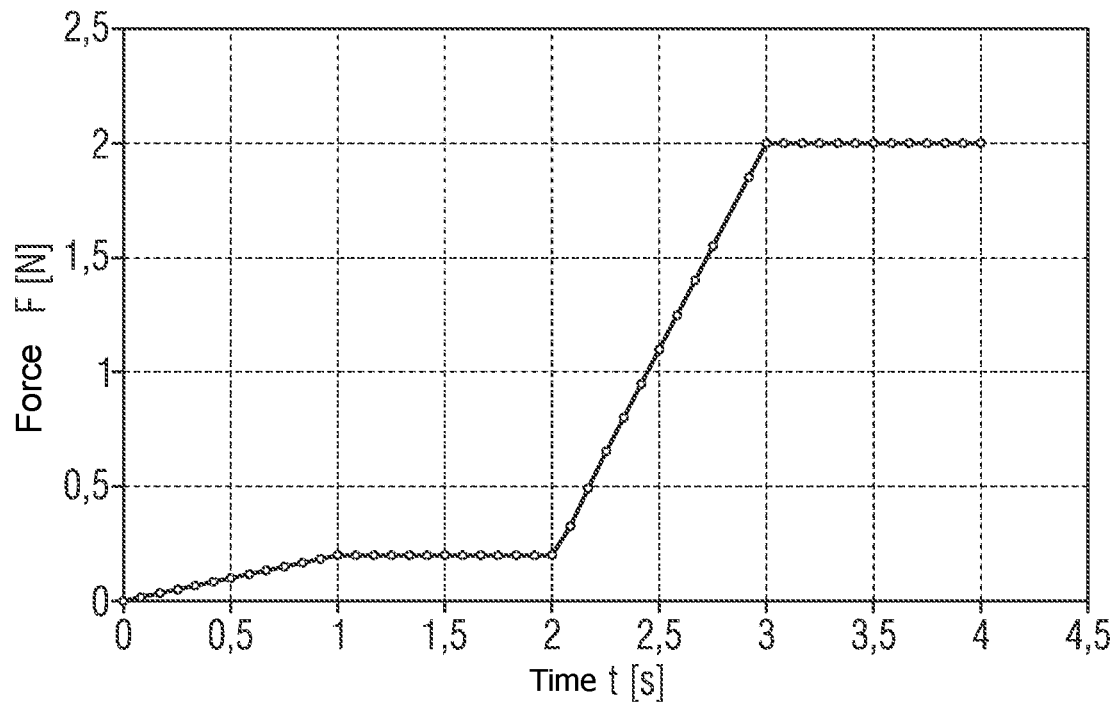
FIG. 6: Diagram 1: The force applied to the tip in the longitudinal direction at time t is shown.

Diagram 1 in FIG. 6 shows a force applied to the tip of the first embodiment of the stylus-shaped device in the longitudinal direction L at time t. The force applied to the tip of the first embodiment of the stylus-shaped device is shown in the diagram.

Figure 7:
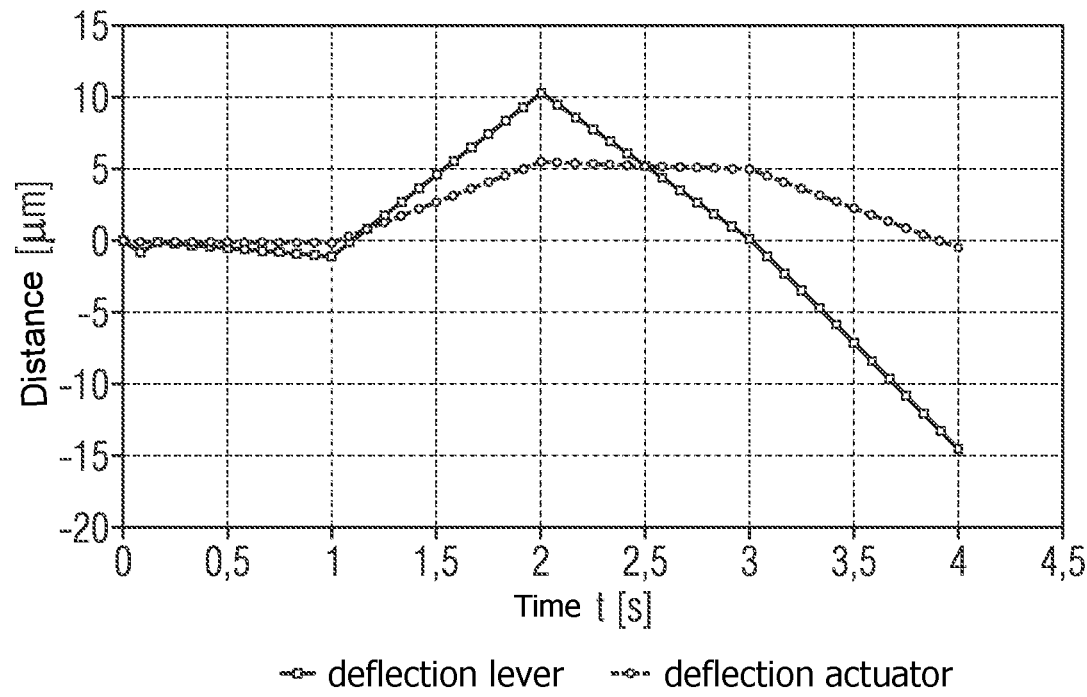
FIG. 7: Diagram 2: The deflection of the lever element and the change in extension of the actuator in the longitudinal direction at time t are shown.

Diagram 2 in FIG. 7 shows the deflection of the lever element and the change in extension of the actuator in the longitudinal direction L at time t for the first embodiment of the stylus-shaped device.

In a first step, a stylus 10 according to the first embodiment is placed with its tip 12 on a surface at the time t=0 s (second) and pressed lightly against this surface. A pressure force is continuously increased until time t=1 s. A constant force of 0.2 N then acts on the tip in the longitudinal direction L.

The applied force causes the tip 12 to move in the direction of the lever element 6 and bend it in the direction of the piezoelectric actuator 1, thereby applying a biasing force to the actuator.

The steps described can be carried out analogously with the second and third embodiments.

In the time interval between t=1 s and t=2 s, an electrical voltage is now applied to the piezoelectric actuator 1 in a second step. This causes the actuator 1 to expand. The maximum change in extension of the actuator 1 at the time t=2 s is approx. 5 µm in the longitudinal direction L (compare the diagram in FIG. 7).

According to the mechanism described above, the change in extension of the actuator 1 is transferred into a forward deflection of the lever element 6 in the longitudinal direction L. The deflection of the lever element 6 is greater than the change in extension of the actuator 1. The deflection of the lever element 6 is greater than the change in extension of the actuator 1.

In the present example, the free end of the lever element 6 is moved more than 13 µm forward in the longitudinal direction L. Thus, the tip 12 is moved forward in the longitudinal direction L of the stylus 10 by a corresponding amount.

In a third step, the tip 12 is then pressed against the surface with a higher force. Up to time t=3 s, the pressing force is increased to 2 N in the longitudinal direction L. The pressure force is then kept constant at 2 N until time t=4 s (compare the diagram in FIG. 6).

Due to the higher contact pressure, the tip 12 and thus the lever element 6 are displaced backwards along the longitudinal direction L. The lever element 6 is then moved back to the contact area 4. At time t=3 s, the lever element 6 is again in contact with the contact area 4.

If the lever element 6 is then pressed further against the actuator 1 with a constant force from time t=3 s, as shown in the diagram in FIG. 7, and the electrical voltage is reduced to 0 again (fourth step), the piezoelectric material of the actuator 1 contracts. At time t=4 s, the same extension of actuator 1 as at the start time t=OS is reached again.

Figure 8:
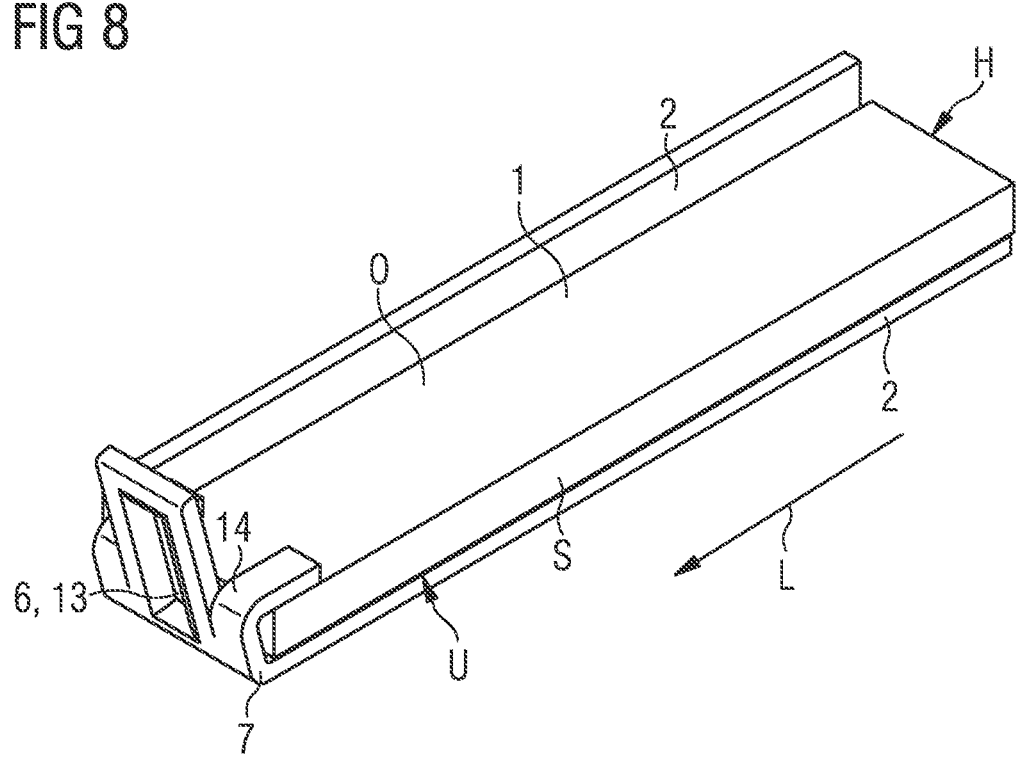
FIG. 8: Perspective view of a fourth embodiment of the piezoelectric actuator and mechanical amplifier.
Figure 9:
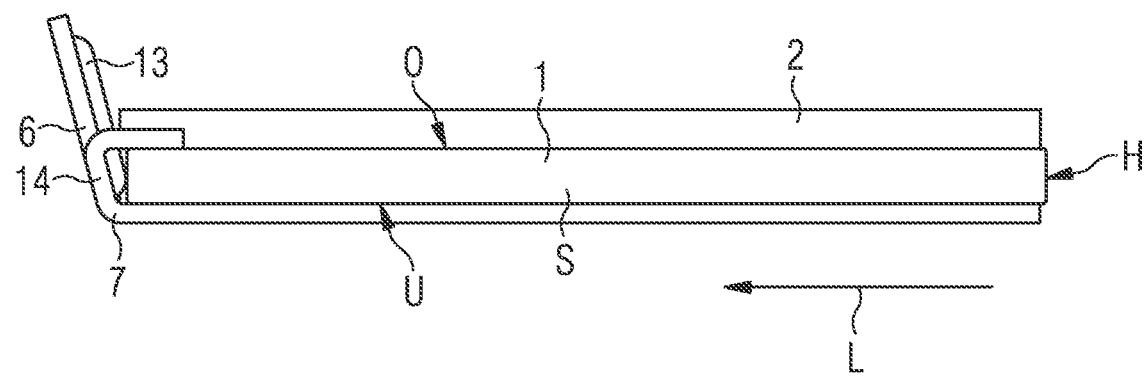
FIG. 9: Side view of the fourth embodiment of the piezoelectric actuator and the mechanical amplifier.

FIGS. 8, 9 and 10 show further modified embodiments.

Similar or identical features as in the previous embodiment examples are provided with the same reference signs and, in order to avoid repetition, are not described again in detail.

In the fourth embodiment, shown in FIG. 8 and FIG. 9, the surface of the lever element 6 facing the piezoelectric actuator 1 has a bend 13 formed in the direction of the piezoelectric actuator 1, with the piezoelectric actuator 1 only abutting the bend 13. A separate force transmission part is not provided in this modification.

Analogous to the first embodiment, the actuator 1 is embedded in a carrier element 2 made of metal. The carrier element 2 abuts and is bonded to a plurality of surfaces of the actuator 1, in particular to the bottom surface U and a side surface S of the actuator 1. Preferably, the actuator 1 is bonded in particular to a rear portion of the bottom surface U and the side surface S remote from a front surface V facing the lever element.

When an electrical voltage is applied to the actuator 1, it causes a change in the extension of the actuator 1 and thus also a forward movement of the actuator 1 in the longitudinal direction L.

In the present example, the lever element 6 is formed from the same component as the carrier element 2. For this purpose, the carrier element 2 has a section which rests against the front side V of the actuator 1 and is connected to the rest of the carrier element 2 only along a bending axis 7. The component is thinned along the bending axis 7.

In this embodiment, a bend 13 is formed centrally in the lever element 6. The bend 13 curves in the direction of the front side V of the piezoelectric actuator 1 and rests against it. A contact area between piezoelectric actuator 1 and lever element 6 is thus formed exclusively on the protruding surface of bend 13. Thus, the force is transmitted from the actuator 1 to the lever element 6 at a defined point, so that a defined factor of the leverage effect can be set.

The bend in the lever element 6 further increases its rigidity and stability.

Furthermore, optional tabs 14 are provided on the side of the lever element in the embodiment described, which are cut out of the side of the lever element and bent in the direction of the piezoelectric actuator, where they are bonded, for example, to its uppermost side surface O.

When the actuator 1 contracts, these tabs 14 cause the lever element 6 to move back in the direction of the piezoelectric actuator 1. Unlike in the first embodiment, no external action is required for this.

The actuator 1 and the carrier element 2 are installed in the stylus-shaped device 10 analogously to the first embodiment example, which can also be used by a user analogously to the first embodiment example. The function of the stylus-shaped device is analogous to the first embodiment example.

In the fifth embodiment, shown in FIG. 10 and FIG. 11, a force transmission part 15 is fixed on a surface of the lever element 6 facing the piezoelectric actuator 1, wherein the piezoelectric actuator 1 abuts only against the force transmission part 15.

The force transmission part 15 then has the advantage of mechanically reinforcing the lever element 6. The force transmission part 15 has a high rigidity, so that the rigidity of the lever element is also improved.

Preferably, the lever element 6 and the force transmission part 15 comprise different materials. Preferably, the force transmission part 15 comprises stainless steel.

A contact edge 15a of the force transmission part 15, which faces the piezoelectric actuator 1 and is in contact with the piezoelectric actuator 1, is ground down to provide a contact area with the largest possible surface area.

The force transmission part 15 is bonded to the surface of the lever element 6 facing the piezoelectric actuator 1. Preferably, the force transmission part 15 covers almost the entire surface. The dimensions of the lever element 6 and the force transmission part 15 are thus similar. In the example, the force transmission part 15 is designed as a flat plate that is bonded to the surface of the lever element 6.

Analogous to the first embodiment, the actuator 1 is embedded in a carrier element 2 made of metal. The carrier element 2 abuts a plurality of surfaces of the actuator 1, in particular a long portion 21 of the carrier element 2 abuts a bottom surface U and a rear portion 22 of the carrier element 2 abuts a rear surface H of the actuator 1. The carrier element 2 is designed as a single component. In the present example, the lever element 6 is formed from the same component as the carrier element 2. For this purpose, the carrier element 2 has a section which rests against the front side V of the actuator 1 and is connected to the rest of the carrier element 2 only along a bending axis 7. The component is thinned along the bending axis 7.

The actuator 1 is thus clamped between the rear section 22, the opposite lever element 6 and the long section 21.

The actuator 1 and the carrier element 2 are installed in the stylus-shaped device 10 analogously to the previous embodiment examples, which can also be used by a user analogously to the first embodiment example. The function of the stylus-shaped device is analogous to the previous embodiment examples.

The invention claimed is:

1. An actuator unit designed to generate a haptic signal, comprising:
   a piezoelectric actuator configured to change its extension in a longitudinal direction in response to an electrical voltage, thereby generating the haptic signal,
   a mechanical amplifier designed to amplify the haptic signal by converting the change in extension of the piezoelectric actuator into a movement of the actuator unit,
   where the movement is in the longitudinal direction,
   wherein the movement of the actuator unit takes place over a distance which is longer than the change in extension of the piezoelectric actuator,
   wherein the longitudinal direction is the direction in which an extension of the piezoelectric actuator is greatest,
   wherein the mechanical amplifier comprises a carrier element that fixes the piezoelectric actuator,
   wherein the mechanical amplifier comprises a lever element fixed at a first end to the carrier element,
   wherein the piezoelectric actuator abuts the lever element, so that a change in extension of the piezoelectric actuator leads to a movement of a second end of the lever element in the longitudinal direction, which is opposite to the first end,
   wherein a force transmission part is fixed on a surface of the piezoelectric actuator facing the lever element, wherein the lever element only abuts against the force transmission part, and
   wherein the force transmission part has a bend formed in the direction of the lever element, wherein the lever element only abuts the bend.

2. The actuator unit according to claim 1, comprising a control unit which is designed to apply a voltage to the piezoelectric actuator.

3. The actuator unit according to claim 1, wherein the piezoelectric actuator comprises a multilayer element having piezoelectric ceramic layers or piezoelectric polymer layers,
   wherein the layers are stacked in a stacking direction perpendicular to the longitudinal direction.

4. The actuator unit according to claim 1, wherein the piezoelectric actuator is configured to have a voltage applied to the actuator in a transverse direction perpendicular to the longitudinal direction, which causes an change in extension of the piezoelectric actuator in the longitudinal direction according to the d31 effect.

5. The actuator unit according to claim 1, wherein the carrier element and the lever element are connected via a bending joint.

6. The actuator unit according to claim 1, wherein a force transmission part is fixed on a surface of the lever element facing the piezoelectric actuator, wherein the piezoelectric actuator abuts only against the force transmission part.

7. The actuator unit according to claim 6, wherein the force transmission part has a bend formed in the direction of the piezoelectric actuator, wherein the piezoelectric actuator only abuts the bend.

8. The actuator unit according to claim 1, wherein a surface of the lever element facing the piezoelectric actuator has a bend formed in the direction of the piezoelectric actuator, wherein the piezoelectric actuator only abuts the bend.

9. The actuator unit according to claim 1, wherein one or more areas are bent out of the lever element, which are fixed to the piezoelectric actuator.

10. The actuator unit according to claim 1,
    wherein the piezoelectric actuator is attached to the carrier element in a planar manner, so that a change in extension of the piezoelectric actuator leads to a deformation of the carrier element, and
    wherein a bent sheet is further attached to one end of the carrier element, which bends in the longitudinal direction depending on the deformation of the carrier element.

11. The actuator unit according to claim 1, wherein the actuator unit is designed to be moved in the longitudinal direction over a distance that is at least twice as long as the change in extension of the piezoelectric actuator.

12. A stylus-shaped input and/or output device comprising a housing and an actuator unit arranged therein according to claim 1, wherein
    the mechanical amplifier is designed to convert the change in extension of the piezoelectric actuator into a movement of the actuator unit relative to the housing,
    wherein the movement takes place in a longitudinal direction of the stylus-shaped device which coincides with the longitudinal direction of the actuator unit.

13. The stylus-shaped input and/or output device according to claim 12 further comprising a sensor, which is an inclination sensor, a distance sensor, a speed sensor or an acceleration sensor.

14. The stylus-shaped input and/or output device according to claim 13, configured to generate a haptic signal that replicates a surface profile,
    wherein the values measured by the sensor are processed when controlling the actuator.

15. The stylus-shaped input and/or output device according to claim 12,
    wherein the piezoelectric actuator is configured to be used as a pressure sensor.

16. The actuator unit according to claim 10,
    wherein the carrier element is bonded to the piezoelectric actuator on at least one longitudinal side, and wherein the bent sheet is firmly connected to the longitudinal sides of the carrier element at two ends.

17. A method for generating a haptic signal with a stylus-shaped input and/or output device comprising an actuator unit with a piezoelectric actuator,
    wherein a voltage is applied by a control unit to the piezoelectric actuator in a direction perpendicular to a longitudinal direction and the piezoelectric actuator thereby changes its extension in the longitudinal direction, and
    wherein the change in extension is converted by a mechanical amplifier into a movement of the actuator unit in the longitudinal direction,
    wherein the actuator unit is moved in the longitudinal direction over a distance which is longer than the change in extension of the piezoelectric actuator,
    wherein the longitudinal direction is the direction in which an extension of both the piezoelectric actuator and the stylus-shaped input and/or output device is greatest,
    wherein the mechanical amplifier comprises a carrier element that fixes the piezoelectric actuator,
    wherein the mechanical amplifier comprises a lever element fixed at a first end to the carrier element,
    wherein the piezoelectric actuator abuts the lever element, so that a change in extension of the piezoelectric actuator leads to a movement of a second end of the lever element in the longitudinal direction, which is opposite to the first end, wherein a force transmission part is fixed on a surface of the piezoelectric actuator facing the lever element, wherein the lever element only abuts against the force transmission part, and wherein the force transmission part has a bend formed in the direction of the lever element, wherein the lever element only abuts the bend.

18. An actuator unit designed to generate a haptic signal, comprising:

a piezoelectric actuator configured to change its extension in a longitudinal direction in response to an electrical voltage, thereby generating the haptic signal, a mechanical amplifier designed to amplify the haptic signal by converting the change in extension of the piezoelectric actuator into a movement of the actuator unit, where the movement is in the longitudinal direction, wherein the movement of the actuator unit takes place over a distance which is longer than the change in extension of the piezoelectric actuator, wherein the longitudinal direction is the direction in which an extension of the piezoelectric actuator is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein a force transmission part is fixed on a surface of the lever element facing the piezoelectric actuator, wherein the piezoelectric actuator abuts only against the force transmission part.

19. An actuator unit designed to generate a haptic signal, comprising:

a piezoelectric actuator configured to change its extension in a longitudinal direction in response to an electrical voltage, thereby generating the haptic signal, a mechanical amplifier designed to amplify the haptic signal by converting the change in extension of the piezoelectric actuator into a movement of the actuator unit, where the movement is in the longitudinal direction, wherein the movement of the actuator unit takes place over a distance which is longer than the change in extension of the piezoelectric actuator, wherein the longitudinal direction is the direction in which an extension of the piezoelectric actuator is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein a surface of the lever element facing the piezoelectric actuator has a bend formed in the direction of the piezoelectric actuator, wherein the piezoelectric actuator only abuts the bend.

20. An actuator unit designed to generate a haptic signal, comprising:

a piezoelectric actuator configured to change its extension in a longitudinal direction in response to an electrical voltage, thereby generating the haptic signal, a mechanical amplifier designed to amplify the haptic signal by converting the change in extension of the piezoelectric actuator into a movement of the actuator unit, where the movement is in the longitudinal direction, wherein the movement of the actuator unit takes place over a distance which is longer than the change in extension of the piezoelectric actuator, wherein the longitudinal direction is the direction in which an extension of the piezoelectric actuator is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein one or more areas are bent out of the lever element, which are fixed to the piezoelectric actuator.

21. An actuator unit designed to generate a haptic signal, comprising:

a piezoelectric actuator configured to change its extension in a longitudinal direction in response to an electrical voltage, thereby generating the haptic signal, a mechanical amplifier designed to amplify the haptic signal by converting the change in extension of the piezoelectric actuator into a movement of the actuator unit, where the movement is in the longitudinal direction, wherein the movement of the actuator unit takes place over a distance which is longer than the change in extension of the piezoelectric actuator, wherein the longitudinal direction is the direction in which an extension of the piezoelectric actuator is greatest, wherein the mechanical amplifier comprises a carrier element that fixes the piezoelectric actuator, wherein the piezoelectric actuator is attached to the carrier element in a planar manner, so that a change in extension of the piezoelectric actuator leads to a deformation of the carrier element, and wherein a bent sheet is further attached to one end of the carrier element, which bends in the longitudinal direction depending on the deformation of the carrier element.

22. A method for generating a haptic signal with a stylus-shaped input and/or output device comprising an actuator unit with a piezoelectric actuator, wherein a voltage is applied by a control unit to the piezoelectric actuator in a direction perpendicular to a longitudinal direction and the piezoelectric actuator thereby changes its extension in the longitudinal direction, and wherein the change in extension is converted by a mechanical amplifier into a movement of the actuator unit in the longitudinal direction, wherein the actuator unit is moved in the longitudinal direction over a distance which is longer than the change in extension of the piezoelectric actuator, wherein the longitudinal direction is the direction in which an extension of both the piezoelectric actuator and the stylus-shaped input and/or output device is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein a force transmission part is fixed on a surface of the lever element facing the piezoelectric actuator, wherein the piezoelectric actuator abuts only against the force transmission part.

23. A method for generating a haptic signal with a stylus-shaped input and/or output device comprising an actuator unit with a piezoelectric actuator, wherein a voltage is applied by a control unit to the piezoelectric actuator in a direction perpendicular to a longitudinal direction and the piezoelectric actuator thereby changes its extension in the longitudinal direction, and wherein the change in extension is converted by a mechanical amplifier into a movement of the actuator unit in the longitudinal direction, wherein the actuator unit is moved in the longitudinal direction over a distance which is longer than the change in extension of the piezoelectric actuator, wherein the longitudinal direction is the direction in which an extension of both the piezoelectric actuator and the stylus-shaped input and/or output device is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein a surface of the lever element facing the piezoelectric actuator has a bend formed in the direction of the piezoelectric actuator, wherein the piezoelectric actuator only abuts the bend.

24. A method for generating a haptic signal with a stylus-shaped input and/or output device comprising an actuator unit with a piezoelectric actuator, wherein a voltage is applied by a control unit to the piezoelectric actuator in a direction perpendicular to a longitudinal direction and the piezoelectric actuator thereby changes its extension in the longitudinal direction, and wherein the change in extension is converted by a mechanical amplifier into a movement of the actuator unit in the longitudinal direction, wherein the actuator unit is moved in the longitudinal direction over a distance which is longer than the change in extension of the piezoelectric actuator, wherein the longitudinal direction is the direction in which an extension of both the piezoelectric actuator and the stylus-shaped input and/or output device is greatest, wherein the mechanical amplifier comprises a carrier element that fixes the piezoelectric actuator, wherein the mechanical amplifier comprises a lever element fixed at a first end to the carrier element, wherein the piezoelectric actuator abuts the lever element, so that a change in extension of the piezoelectric actuator leads to a movement of a second end of the lever element in the longitudinal direction, which is opposite to the first end, and wherein one or more areas are bent out of the lever element, which are fixed to the piezoelectric actuator.

25. A method for generating a haptic signal with a stylus-shaped input and/or output device comprising an actuator unit with a piezoelectric actuator, wherein a voltage is applied by a control unit to the piezoelectric actuator in a direction perpendicular to a longitudinal direction and the piezoelectric actuator thereby changes its extension in the longitudinal direction, and wherein the change in extension is converted by a mechanical amplifier into a movement of the actuator unit in the longitudinal direction, wherein the actuator unit is moved in the longitudinal direction over a distance which is longer than the change in extension of the piezoelectric actuator, wherein the longitudinal direction is the direction in which an extension of both the piezoelectric actuator and the stylus-shaped input and/or output device is greatest, wherein the mechanical amplifier comprises a carrier element that fixes the piezoelectric actuator, wherein the piezoelectric actuator is attached to the carrier element in a planar manner, so that a change in extension of the piezoelectric actuator leads to a deformation of the carrier element, and wherein a bent sheet is further attached to one end of the carrier element, which bends in the longitudinal direction depending on the deformation of the carrier element.

* * * * *